United States Patent
Olsson et al.

(10) Patent No.: US 8,259,756 B2
(45) Date of Patent: Sep. 4, 2012

(54) METHOD AND ARRANGEMENT IN A MOBILE TELECOMMUNICATION NETWORK

(75) Inventors: Jonas Fröberg Olsson, Ljungsbro (SE); Rong Hu, Beijing (CN); Jinhua Liu, Beijing (CN); Per Magnusson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 666 days.

(21) Appl. No.: 12/301,355

(22) PCT Filed: May 18, 2006

(86) PCT No.: PCT/SE2006/050141
§ 371 (c)(1),
(2), (4) Date: Nov. 18, 2008

(87) PCT Pub. No.: WO2007/136310
PCT Pub. Date: Nov. 29, 2007

(65) Prior Publication Data
US 2009/0268696 A1    Oct. 29, 2009

(51) Int. Cl.
*H04J 3/06* (2006.01)

(52) U.S. Cl. ............................................. 370/503

(58) Field of Classification Search ........... 370/310, 370/328, 329, 336, 337, 345, 347, 348, 350, 370/431, 437, 442, 443, 458, 464, 498, 503, 370/521; 455/39, 500, 507, 509, 515–517, 455/522, 91, 127.1, 127.5
See application file for complete search history.

(56) References Cited

U.S. PATENT DOCUMENTS

| | | | |
|---|---|---|---|
| 6,934,268 B1 * | 8/2005 | Hedlund et al. | 370/311 |
| 7,724,768 B2 * | 5/2010 | Carlsson et al. | 370/465 |
| 2004/0202104 A1 * | 10/2004 | Ishii et al. | 370/225 |
| 2006/0018282 A1 * | 1/2006 | Kwak et al. | 370/331 |
| 2006/0120403 A1 * | 6/2006 | Murata et al. | 370/468 |
| 2006/0146756 A1 * | 7/2006 | Wang et al. | 370/335 |
| 2007/0004419 A1 * | 1/2007 | Ji et al. | 455/447 |
| 2007/0116007 A1 * | 5/2007 | Xiao et al. | 370/395.4 |

* cited by examiner

*Primary Examiner* — Anh-Vu Ly
*Assistant Examiner* — Omar Ghowrwal (57) ABSTRACT

The present invention is based on the idea to allocate HS-DSCH power at TTI based on the HS-SCCH allocation of UI and an estimation of the HS-SCCH allocation of TTI+1. The estimation of the HS-SCCH allocation of TTI+1 is based on estimation of which users that will be scheduled at the time denoted TTI+1. i.e., the users that have a high probability to be selected for transmission by the scheduler at the time denoted TTI+1 are determined. That is performed by calculating for each user the probability that the user will be selected for transmission by the scheduler. The users that have a high probability to be scheduled at the time TTI+1 are included in a candidate set according to the present invention.

16 Claims, 7 Drawing Sheets

METHOD AND ARRANGEMENT IN A MOBILE TELECOMMUNICATION NETWORK

TECHNICAL FIELD

The present invention relates to a mobile telecommunication network. In particular, it relates to optimization of the NodeB power utilization during High Speed Downlink Packet Access (HSDPA) transmissions.

BACKGROUND

The present invention relates to methods and arrangement in a base station in mobile telecommunication network having at least two arbitrary communication channels, e.g. a data channel and an associated control channel, which share a common resource where the timing of resource sharing is overlapping.

Figure 1:
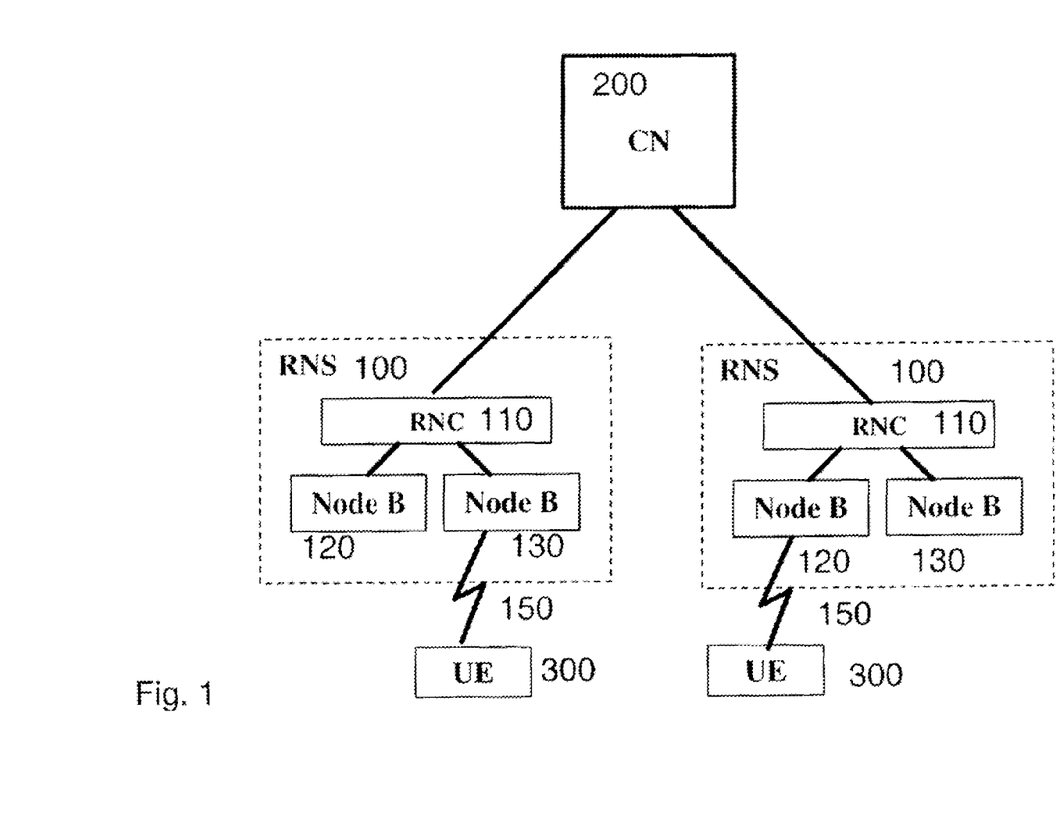
FIG. 1 illustrates a mobile telecommunication network wherein the present invention may be implemented.

An example of such a mobile telecommunication network is a UMTS terrestrial radio access network (UTRAN). The UTRAN is illustrated in FIG. 1 and comprises at least one Radio Network System 100 connected to the Core Network (CN) 200. The CN is connectable to other networks such as the Internet, other mobile networks e.g. GSM systems and fixed telephony networks. The RNS 100 comprises at least one Radio Network Controller 110. Furthermore, the respective RNC 110 controls a plurality of Node-Bs 120,130 that are connected to the RNC by means of the Iub interface 140. Each Node B, also referred to as base station, covers one or more cells and is arranged to serve the User Equipment (UE) 300 within said cell. Finally, the UE 300, also referred to as mobile terminal, is connected to one or more Node Bs over the Wideband Code Division Multiple Access (WCDMA) based radio interface 150.

Requirements for mobile data access are increasing and demand for higher bitrates is growing. To meet these needs the HSDPA specification has been defined. HSDPA is based on WCDMA evolution standardized as part of 3GPP Release 5 WCDMA specifications. HSDPA is a packet-based data service in WCDMA downlink with data transmission peak rate up to 14.4 Mbps over a 5 MHz bandwidth. Thus HSDPA improves system capacity and increases user data rates in the downlink direction. The improved performance is based on adaptive modulation and coding, a fast scheduling function and fast retransmissions with soft combining and incremental redundancy. The adaptive modulation and coding makes it possible to adapt the modulation scheme and coding according to the quality of the radio link. The fast scheduling function of the transmission of data packets over the radio interface is performed in the base station based on information about the channel quality, terminal capability, QoS class and power/code availability. The scheduling is denoted fast because it is performed as close to the radio interface as possible and because a short frame length is used. Fast retransmission implies that the requests for retransmission are performed by the base station instead of the Radio Network Controller (RNC) as in traditional WCDMA systems. By implementing the retransmission function in the base station instead of the RNC it is possible to achieve a faster retransmission.

HSDPA utilizes a transport channel named the High Speed Downlink Shared Channel (HS-DSCH) that makes efficient use of valuable radio frequency resources and takes bursty packet data into account. This is a shared transport channel which means that resources, such as channelization codes, transmission power and infra structure hardware, is shared between several users. When one user has sent a data packet over the network, another user gets access to the resources and so fourth. In other words, several users can be time multiplexed so that during silent periods, the resources are available to other users. On the other hand, several users can share the resource simultaneously by code multiplexing. Furthermore, HSDPA utilizes a control channel named the High Speed Shared Control Channel (HS-SCCH) that serves the purpose of informing which UE that is to receive the HS-DSCH in the next time period. The HS-SCCH also tells the scheduled UE about transmission parameters of the HS-DSCH.

The HS-SCCH channel has fixed control information content and thereby, the required transmission power needs to be adjusted according to the radio channel quality to be received by the UE. The HS-DSCH has variable payload information content for best effort data and the amount of data is adapted to the available power and radio channel quality.

Figure 2:
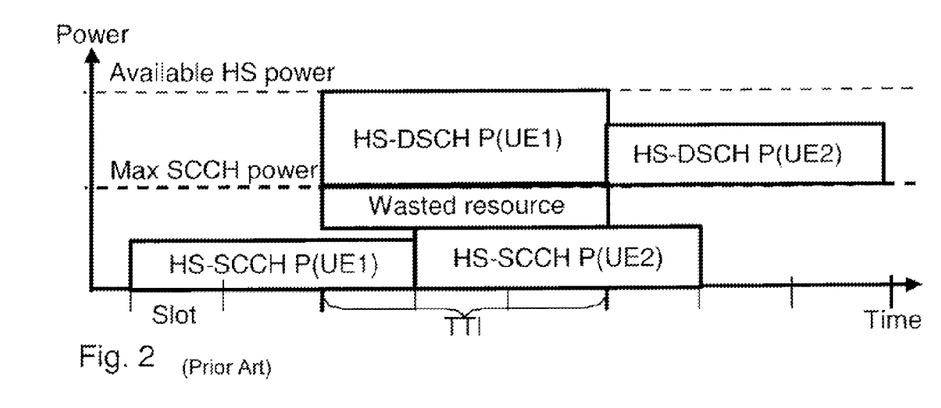
FIG. 2 illustrates a method according to prior art, wherein the maximum SCCH power is used when estimating HS-DSCH power.

The transmission time in a WCDMA system is divided into Transmission Time Intervals (TTIs). The TTI length for the HS-DSCH equals 2 ms and a TTI is divided into three slots as shown in FIG. 2. The timing for the High Speed Shared Control Channel (HS-SCCH) is two slots ahead of the HS-DSCH for a particular UE. That depends on that information such as transport format, UE identity and channelization code set is sent on the HS-SCCH in order to prepare the UE for receiving data on the HS-DSCH.

Due to the staggered timing of the High Speed Downlink Shared Channel (HS-DSCH) and the High Speed Shared Control Channel (HS-SCCH) transmissions as shown in FIG. 2, the base station usually adopts a relatively conservative solution when the available power for the HS-DSCH is estimated by assuming that the HS-SCCH transmission for the next TTI will be the maximum allowed HS-SCCH power. Thus, resources may be wasted (denoted wasted resource) if the maximal allowed HS-SCCH is not required to be used shown in FIG. 2. It should be noted that this application relates to the case when the HS-SCCH power is set individual for each UE.

Figure 3:
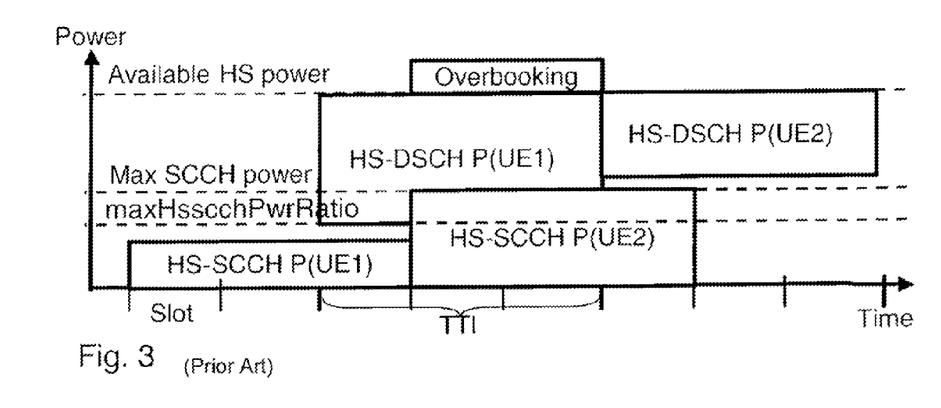
FIG. 3 illustrates a method according to prior art, wherein the actual SCCH power is used when estimating HS-DSCH power.

An alternative solution is to use the actual left power for the HS-DSCH, and not to assume that the maximal HS-SCCH power is used. However in this solution, there is a risk that the total power level exceeds the available total power level due to the staggered timing of HS-DSCH and HS-SCCH. I.e. the selected power of the HS-DSCH for a first scheduled UE together with the HS-SCCH power of a subsequently scheduled second UE may exceed the available HS power. This overbooking is illustrated in FIG. 3. Due to the risk of overbooking the downlink, power limiting functions in the base station will usually reduce power for all channels (including common control channels and traffic channels) and eventually degrade the quality of all on going connections in the cell.

Figure 4:
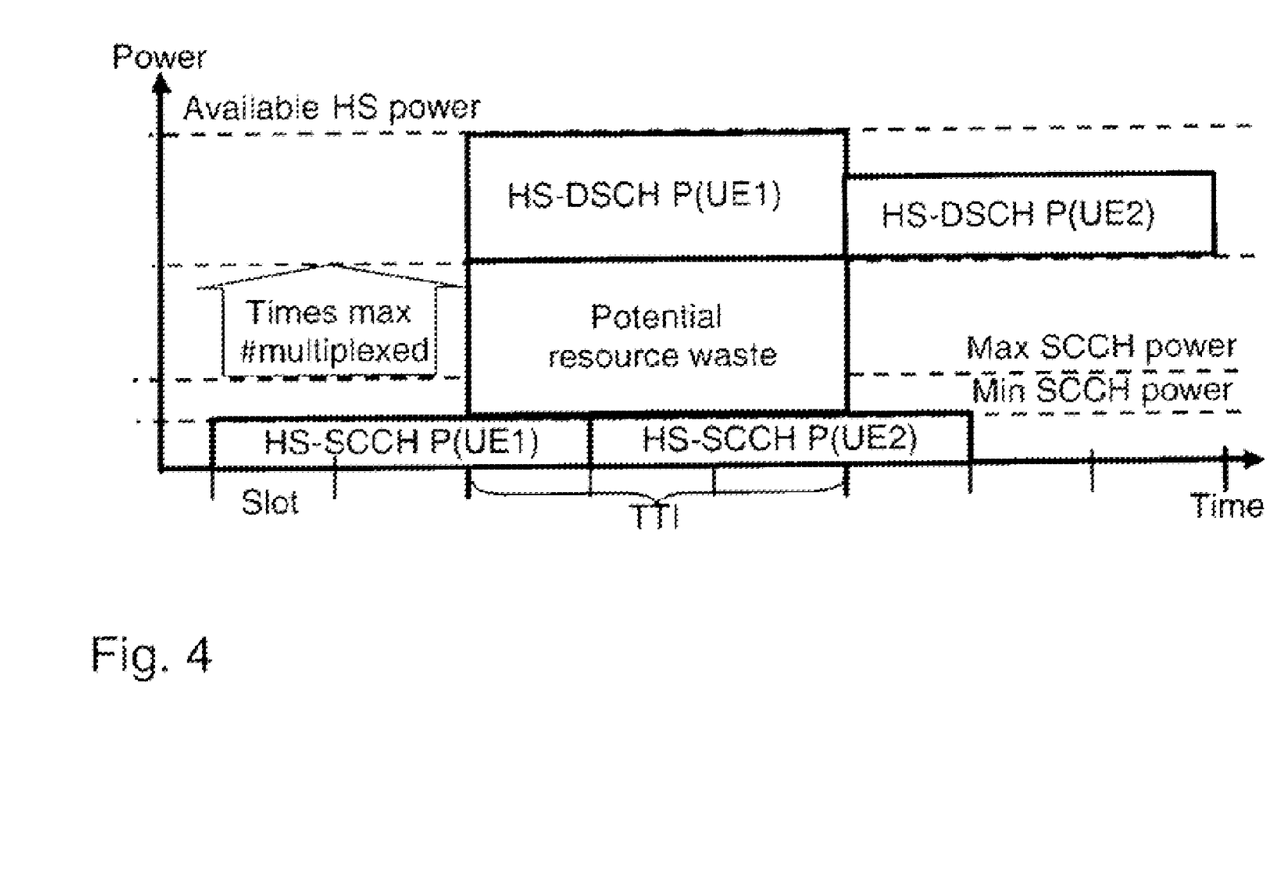
FIG. 4 illustrates potential power waste in the case of code multiplexing.

The problem with the trade-off between overbooking risk vs. under utilization of power will increase in the case of code multiplexing. I.e. a multiple of users are code-multiplexed onto the same TTI. In that case there is one HS-SCCH for each multiplexed user. Thus, it will be a large waste of power to reserve the maximal HS-SCCH power times the maximal number of multiplexed users. The potential resource waste is illustrated in FIG. 4.

SUMMARY

Thus, an object of the present invention is to provide a method and arrangements that utilize the power of the base station more efficiently than existing solutions when channels with staggered timing are used, which results in higher system performance in terms of higher throughput, higher user bit rate, decreased delay and enhanced system capacity.

Thus, the arrangement in a base station according to the present invention makes it possible to utilize the power of the base station more efficiently. The base station comprises means for transmitting control information to users on a first channel such as a HS-SCCH, means for transmitting data packets to said users on a second channel such as a HS-DSCH, wherein the second channel is associated to the first channel. The base station comprises further a scheduler for scheduling users on the first and the second channels, wherein the timing of the first and second channels are overlapping. Moreover, the arrangement of the invention comprises means for determining a candidate set of subsets of users, wherein the subsets of users included in the candidate set has a high probability to be scheduled by said scheduler at a time denoted TTI+t. It comprises further means for estimating a required power of the first channel for a subset of users of the candidate set requiring the highest power of the subsets of users in the candidate set at TTI+t, means for scheduling a subset of users at the time TTI, and means for determining the required power of the first channel at the time TTI for said scheduled users. Further, means for determining the power of the first channel to be reserved at TTI is provided. The determination is based on the determined power of the first channel at TTI for said scheduled users and said estimated required power of the first channel for the subset of users of the candidate set requiring the highest power of the subsets of users in the candidate set at TTI+t. Finally, means for determining the power of the second channel to be reserved for the scheduled users based on the determined reserved power of the first channel at TTI is provided by the present invention.

The method according to the present invention comprising the steps of determining a candidate set of subsets of users, wherein the subsets of users included in the candidate set has a high probability to be scheduled by said scheduler at a time denoted TTI+t, estimating a required power of the first channel for a subset of users of the candidate set requiring the highest power of the subsets of users in the candidate set at TTI+t, scheduling a subset of users at the time TTI, determining the required power of the first channel at the time TTI for said scheduled users, determining the power of the first channel to be reserved at TTI based on the determined power of the first channel at TTI for said scheduled users and said estimated required power of the first channel for the subset of users of the candidate set requiring the highest power of the subsets of users in the candidate set at TTI+t and determining the power of the second channel to be reserved for the scheduled users based on the determined reserved power of the first channel at TTI, wherein t is a value equal or larger than one, makes it possible to utilize the power of the base station more efficiently.

The main benefit is that the method and arrangements according to the present invention consider future scheduling decisions without affecting the actual scheduling behaviour. The scheduler that selects users for transmission does not need to be aware of the power setting algorithm described in the invention.

Thus more power can be allocated to HS-DSCH and the risk of overbooking is kept small. To avoid overbooking completely the scheduling algorithm cannot be allowed to choose users that would utilize more HS-SCCH power than allocated for. Hence, the scheduling algorithm need to be aware of how the powers are allocated or to keep track of which users can be selected and which users cannot. Both cases results in a more complex scheduling algorithm. The set of subsets of users that could be selected by the scheduling algorithm without risking overbooking contains the candidate set. Hence, by restricting to the subsets of users that can be chosen by the scheduling algorithm to be the candidate set eliminates the risk of overbooking.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above, the object of the present invention is to allocate base station power for a particular time denoted TTI such that the power of the base station is efficiently utilized. It should be noted that the invention is described in the context of 3G networks and HSDPA. However, the present invention may also be applied in other systems having two associated channels, whereby the timing of the channels are overlapping.

The present invention is based on the idea to allocate. HS-DSCH power at TTI based on the HS-SCCH power allocation of TTI and an estimation of the HS-SCCH allocation of TTI+1. The estimation of the HS-SCCH allocation of TTI+1 is based on estimation of which users that will be scheduled at the time denoted TTI+1. i.e., the users that have a high probability to be selected for transmission by the scheduler at the time denoted TTI+1 are determined. That is performed by calculating for each user the probability that the user will be selected for transmission by the scheduler. The users that have a high probability to be scheduled at the time TTI+1 are included in a candidate set according to the present invention.

It should also be noted that, in the case of code multiplexing, the candidate set may comprise subsets of users that have a high probability to be scheduled at the time TTI+1, wherein users within one subset are multiplexed onto the HS-DSCH channel.

Furthermore, it is noted that the probability that a certain subset of users included in the candidate set to be selected for transmission may be less than for another subset of users not included in the candidate set. The reason is that the probability that e.g. a subset denoted A of users is selected for transmission is the sum of probabilities of subsets containing A (as a true subset, i.e. the intersection is non-empty). Thus, it is the users included in the subsets of the candidate set that have high probability of being selected and not necessarily the subsets themselves. But, it is of course also possible to take into account that certain subsets containing a user have relatively low probability compared to other subsets containing the user. This results in at least two thresholds, one threshold that controls which users that may be included in the subsets in the candidate set, and at least one threshold that control which subsets including the said users that may be included in the candidate set. Hence, in a sense does the subset in the candidate set have high probability to be selected by the scheduling algorithm, but the sense is relative and not necessarily absolute. From the above, the candidate set is in general regarded as a set of subsets of users, but does not rule out the possibility that each subset contain only one user meaning that the candidate set can be defined as just a set of users even in the case of code multiplex.

Subsequently, when the candidate set is determined the required HS-SCCH power of the candidate set is estimated. The required HS-SCCH power of the candidate set is estimated as the maximum required HS-SCCH power for the subsets of the candidate set, where the required HS-SCCH power for a subset of (code multiplexed) users is the sum of the users predicted HS-SCCH powers.

In case the candidate set is defined as a set of users, the estimation of the required HS-SCCH power of finding subsets of users from the candidate set that can, or in general have high probability to, be multiplexed together. The required HS-SCCH power is then estimated as the maximum required HS-SCCH power among those subsets. Which subsets of users should be taken into account may follow the same principles as when creating the candidate set for the case when it is defined as a set of subsets.

For the special case if one user only can be scheduled at the same time (i.e., no code multiplexing), the required HS-SCCH power of the candidate set (being a set of users) is the maximal predicted required HS-SCCH powers of the users in the candidate set.

For transmission at the time TTI, the scheduler first selects one (or more) users to be selected for transmission. When the users have been selected, the required power for the HS-SCCHs for said selected users are determined and reserved. The HS-DSCH power to be allocated for said selected users is determined by considering the required HS-SCCH power for said selected users and the maximum required HS-SCCH power for the candidate set at a time TTI+1. Thus the reserved HS-DSCH power for said selected users at TTI is the total available HS power minus the maximum of the required HS-SCCH power for said selected users and the maximum required HS-SCCH power for the users of the candidate set.

Figure 8:
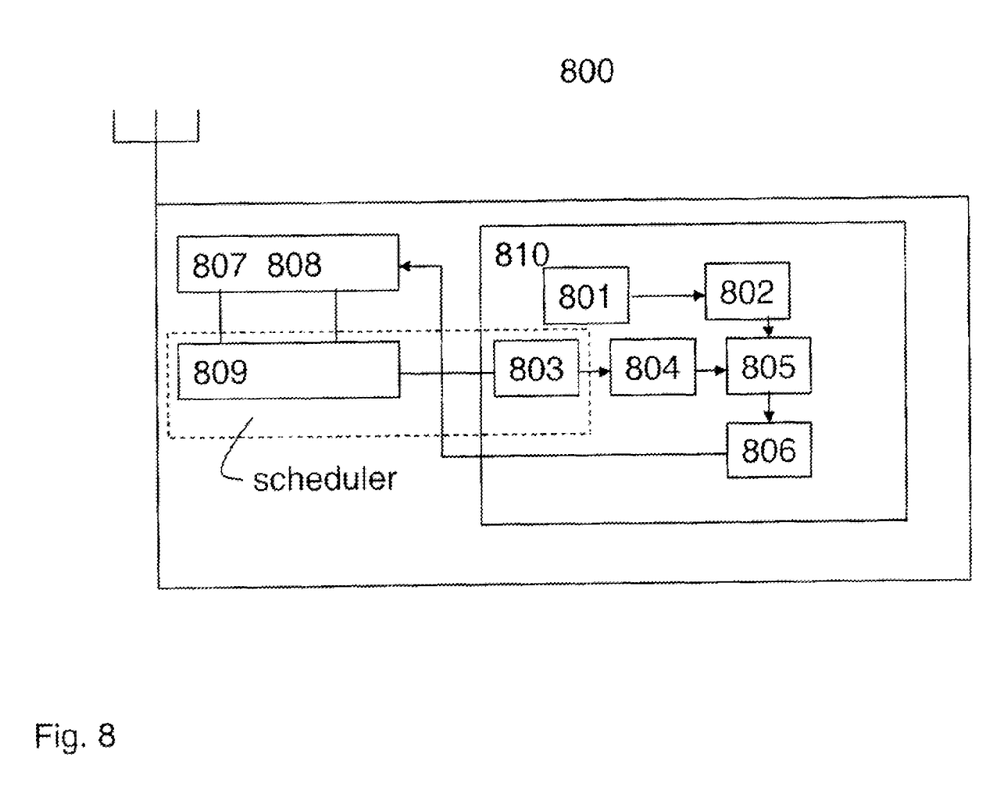
FIG. 8 illustrates a base station according to the present invention.

Thus, the present invention relates to a method and an arrangement 810 in a base station of a mobile telecommunication network. The base station 800 as illustrated in FIG. 8 comprises transmitter means 807 for transmitting control information to users on a first channel such as a HS-SCCH, transmitter means 808 for transmitting data packets to said users on a second channel such as a HS-DSCH, wherein the second channel is associated to the first channel, and a scheduler 809 for scheduling users on the first and the second channels, wherein the timing of the first and second channels are overlapping. The arrangement according to the present invention comprises means 801 for determining a candidate set of subsets of users, wherein the subsets of users included in the candidate set has a high probability to be scheduled by said scheduler at a time denoted TTI+t, means 802 for estimating a required power of the first channel for a subset of users of the candidate set requiring the highest power of the subsets of users in the candidate set at TTI+t, means 803 for scheduling a subset of users at the time TTI, means 804 for determining the required power of the first channel at the time TTI for said scheduled users, means 805 for determining the power of the first channel to be reserved at TTI based on the determined power of the first channel at TTI for said scheduled users and said estimated required power of the first channel for the subset of users of the candidate set requiring the highest power of the subsets of users in the candidate set at TTI+t and means 806 for determining the power of the second channel to be reserved for the scheduled users based on the determined reserved power of the first channel at TTI.

Figure 7:
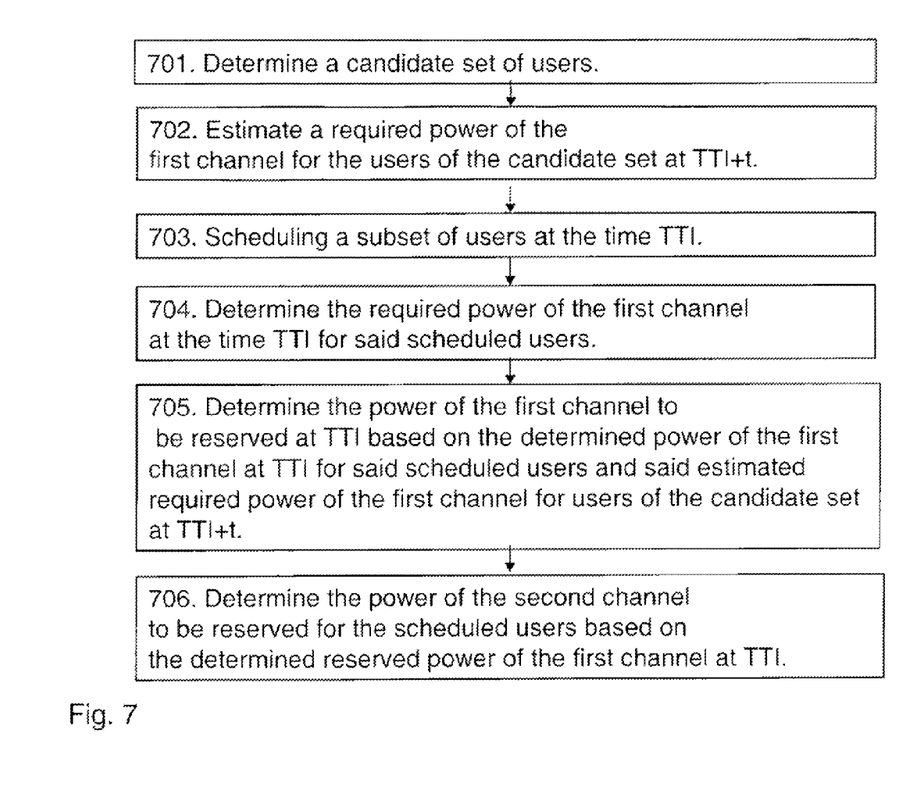
FIG. 7 is a flowchart of the method according to the present invention.

Accordingly, the method of the present invention illustrated by the flowchart of FIG. 7 comprises the steps of:

701. Determine a candidate set of subsets of users, wherein the subsets of users included in the candidate set has a high probability to be scheduled by said scheduler at a time denoted TTI+t.

702. Estimate a required power of the first channel for a subset of users of the candidate set requiring the highest power of the subsets of users in the candidate set at TTI+t.

703. Scheduling a subset of users at the time TTI.

704. Determine the required power of the first channel at the time TTI for said scheduled users.

705. Determine the power of the first channel to be reserved at TTI based on the determined power of the first channel at TTI for said scheduled users and said estimated required power of the first channel for the subset of users of the candidate set requiring the highest power of the subsets of users in the candidate set at TTI+t.

706. Determine the power of the second channel to be reserved for the scheduled users based on the determined reserved power of the first channel at TTI, wherein t is a value equal or larger than one.

The method and arrangement for allocating base station power for the first and second channel such as HS-SCCH power and HS-DSCH power is described in detail below. It should be noted that the present invention is described in the context of a 3GPP compliant HSDPA system, wherein t equals 1. However, the present invention may also be applied in other systems having two associated channels, whereby the timing of the channels are overlapping and t may be a value) $\leq 1$.

If TTI denotes the time for which the HS-DSCH transmission starts, then at time TTI−1 the probability to be scheduled at TTI+1 for active users are determined by the scheduler. An active user implies a user that can be selected for transmission by the scheduler i.e. users in CELL_DCH state having their radio access bearer mapped on HS-DSCH. The user, however, may or may not have data to transmit (in which case the user may be ignored by the scheduler).

The scheduler may determine the probability for each user to be selected based on one or more parameters. Examples of parameters to consider are:

channel quality index (CQI), the quality of the user's channel, wherein the CQI determines the amount of data the user can transmit, measurement of the obtained user throughput, average of the user's channel quality, i.e. average CQI, amount of data in the users' buffers, QoS requirements (priority, guaranteed bitrate, maximum delay, jitter etc), and the subscription profile (ex: "gold/silver" users).

When the probability for each active user to be selected by the scheduler is determined, a pre-defined threshold is applied to determine the candidate set of users. The threshold indicates a size of the candidate set according to one embodiment. The threshold indicates according to another embodiment a limit of certain parameter, which implies that users having values of said parameter above or below the threshold are included in the candidate set. Examples how the threshold is selected and how the candidate set is determined are provided below. It should be noted that the size of the subset of users is one in the first two examples below, which means that no multiplexing of users is performed. In the third example it is assumed that at most two can be multiplexed. Further the scheduler used in the examples below determines the probability for each user to be selected based on the CQI.

A "max CQI scheduler" is used which implies that the user with maximal CQI is selected for transmission and it is assumed that only one user may be scheduled each TTI. Further, suppose that there are five (N_active=5) active users (u1-u5) and that the scheduler chooses from u1, u2, u3, u4 and u5, with associated CQI values (at time TTI−1) CQI 1=5, CQI 2=20, CQI 3=18. CQI 4=25 and CQI 5=10, respectively. For example, the candidate set may be selected as:

Example 1

Candidate set of fixed size: If the size of the candidate set is set to 2, then the candidate set (CS) equals CS={{u2}, {u4}}.

Example 2

Probabilistic with threshold: Assign probability: p_i=CQI_i/CQI_max*1/norm_factor, where norm_factor=CQI_1/CQI_max+ . . . +CQI_5/CQI_max. Since CQI_max=30, p_1=0.0641, p_2=0.2564, p_3=0.2308, p_4=0.3205 and p_5=0.1282 are obtained. The candidate set is the set of users for which their p_i is larger than a threshold p_th. With p_th=1/N_active=0.2, the candidate set={{u2}, {u3}, {u4}} is obtained.

Example 3

Code multiplexing with incremental allocation: Resources are allocated incrementally, i.e. first select one user and let the user use all resources if possible. If there are resources left, select another user and give the remaining resources to him/her. Even if there still are resources left no more user will be selected (as at most two users may be multiplexed by assumption). Define q_i to be the probability that user ui is not able to use all resources if he/she is selected first by the scheduling algorithm. Define also p_i|j to be the conditional probability that user ui is selected for transmission if user uj was first selected. Let p1_i denote the probability that user ui is selected first and let p2_i denote the probability that user ui is selected after another user was selected. The p_i|j are zero for i=j and can for i≠j be calculated as:

$$p\_i|j = \frac{p1\_i}{\sum_{k \neq j} p1\_k} \cdot q\_j$$

and the p2_i equals $$p2\_i = \Sigma p\_i|j \cdot p\_j.$$

Putting p1_i=k·p_i, where the p_i are taken from Example 2 above, and using $$\sum_i p1\_i + p2\_i = 1$$

the constant k can be calculated.

Assuming (q_1, q_2, q_3, q_4, q_5)=(1, 1, 0, 1, 0), some numerical calculations give:

$$(p1\_i) = (0.0391 \quad 0.1562 \quad 0.1406 \quad 0.1953 \quad 0.0781),$$

$$(p\_i|j) = (\tilde{p}_{i,j}) = \begin{pmatrix} 0 & 0.0862 & 0 & 0.0943 & 0 \\ 0.2740 & 0 & 0 & 0.3773 & 0 \\ 0.2465 & 0.3104 & 0 & 0.3397 & 0 \\ 0.3425 & 0.4310 & 0 & 0 & 0 \\ 0.1370 & 0.1724 & 0 & 0.1887 & 0 \end{pmatrix}.$$

The probability Pr(ui) that a user ui will be selected for transmission is $$Pr(ui) = p1\_i \cdot (1 - q\_i) + p1\_i \cdot \sum_{j \neq i} p\_j \bigg| i + \sum_{j \neq i} p\_i \bigg| j \cdot p\_j.$$

The first term equals the probability that user ui is scheduled alone, the second term equals the probability that ui is selected first but scheduled together with another user and finally the third term equals the probability that the user is selected after another user has been selected. Some calculations give:

$$(Pr(ui)) = (0.0710 \quad 0.2406 \quad 0.2651 \quad 0.2760 \quad 0.1473).$$

Using the same threshold as in Example 2 to select which users are allowed to be in the subsets of the candidate set. The threshold results in that only the users u2, u3 and u4 may be in the subsets of the candidate set. The probabilities q_i yield that only the subsets {u2, u3}, {u2, u4}, {u3} and {u3, u4} are possible. Hence, there are respectively two subsets containing the user u2 and u4. while there are three subsets containing the user u3. Without taking into consideration how large the probabilities of the subsets containing a user are compared to each other, the candidate set would equal:

$$CS = \{\{u2, u3\}, \{u2, u4\}, \{u3\}, \{u3, u4\}\}.$$

Suppose now, for another example, that it is required that subsets containing a particular user should have a probability at least half the probability of the subset (containing the user) with highest probability. Calculating the probabilities:

$$Pr(\{u2, u3\}) = p\_3|2 \cdot p1\_2 = 0.0485.$$

$$Pr(\{u2, u4\}) = p\_2|4 \cdot p1\_4 + p\_4|2 \cdot p1\_2 = 0.1410$$

$$Pr(\{u3\})=p1\_3*(1-q\_3)=0.1406$$

$$Pr(\{u3,u4\})=p\_3|4*p1\_4=0.0663.$$

Applying the requirement, the candidate set CS={{u3}, {u2, u4}} is obtained.

Then when the candidate set is determined, the required HS-SCCH for candidate set at TTI+1 (HS-SCCHreq(TTI+1)) based on measurements or trends is predicted. As the HS-SCCH is power controlled the used power may be higher or lower than predicted. One example is that the predicted HS-SCCH power equals the maximal previously used HS-SCCH power among the users in the candidate set, e.g. let CS={{u1}, {u3}} and users u1 and u3 used the powers 0.1 W and 0.3 W, respectively, when they were scheduled the last time. Then, the predicted required HS-SCCH power would equal 0.3 W.

By using more values from previous time instances, a more sophisticated predictor could be defined. E.g. if a certain user was scheduled TTI-4 and TTI-2, a linear predictor to predict the required power at time TTI+1 may be used. It is therefore possible to estimate how much the power is likely to increase or decrease if the user is being scheduled compared to the last scheduling instance.

When the required HS-SCCH power for candidate set at TTI+1 (HS-SCCHreq(TTI+1)) is determined, then the HS-SCCH power to be reserved at time TTI (HS-SCCHreserve (TTI) is determined. The HS-SCCH power to be reserved at time TTI (HS-SCCHreserve(TTI) is according to the present invention the maximum of the allocated HS-SCCH(TTI) power at time TTI and the predicted required maximum HS-SCCH power of the candidate set at time TTI+1, i.e. HS-SCCHreserve(TTI)=max(HS-SCCH(TTI), HS-SCCHreq(TTI+1)).

It should be noted that the HS-SCCH power for TTI is transmitted two slots ahead of HS-DSCH for TTI, in the described embodiments This means that HS-DSCH at time TTI cannot get more power than the available power minus the maximum power of {HS-SCCH(TTI), HS-SCCH(TTI+1)}. Note that at time the scheduling instance and power setting instance (i.e., at time TTI-1) the HS-SCCH(TTI+1) power is not known (In fact, scheduling has not yet been performed.)

Further, it is assumed above that the scheduling and the power setting is performed just one TTI before the actual transmission occurs. In real systems, there could however be a larger delay. For example, scheduling and power setting for transmission time TTI may occur at time TTI-D for some real value D>0. (It could, in fact, also be slightly smaller as transmission of HS-SCCH starts two slots before HS-DSCH transmission. Hence, scheduling and power setting is performed at least two slots before transmission of HS-DSCH.)

When the reserved HS-SCCHL power for time TTI has been determined, the HS-DSCH power for time TTI to be allocated for said users is determined based on the reserved HS-SCCH power. I.e. allocate the available HS base station power minus reserved HS-SCCH power i.e. HS-DSCH (TTI)= HSavailable(TTI)-HS-SCCHreserve(TTI), wherein HSavailable(TTI)=the total base station power minus margins minus non-HS power. (Non-HS power is power used for other purposes than for HS-DSCH and HS-SCCH such as dedicated control and data channels and also common channels).

As new measurements arrive and new users are scheduled (possibly also users not included in the candidate set), there is a small risk for overbooking of power in relation to the reserved HS-SCCH power. If the candidate set often contains the users that will be scheduled, overbooking will seldom occur. In fact, even if a scheduled user was not within the candidate set, overbooking only occurs if the user's HS-SCCH power is higher than the reserved HS-SCCH power.

The size of the candidate set, which is controlled by the applied threshold, is preferably based on the users' probability of being scheduled (e.g. by using the CQI as explained above) and the allowed overbooking rate. i.e., if many users are included in the candidate set the overbooking rate is low. But, a large candidate set reduces the power gain. Hence, it is desired to keep the candidate set large enough to avoid overbooking, and at the same time keep it small to gain power. An example how the overbooking can be avoided is described below.

Suppose now that an overbooking probability of P_overbook is allowed. If the number of overbooking occurrences is counted over time, then the applied threshold is OK if #overbooking occurrences/#transmissions<P_overbook. This threshold may be fixed or set in an adaptive manner. In the case of adaptive threshold, the threshold may be controlled by the well-known jump algorithm triggered by overbooking occurrences. The jump algorithm is based on the idea to increase the threshold by a small amount (i.e. fewer users are selected) for every TTI without overbooking, and decrease the threshold a large amount for each TTI when overbooking occurs.

Figure 5:
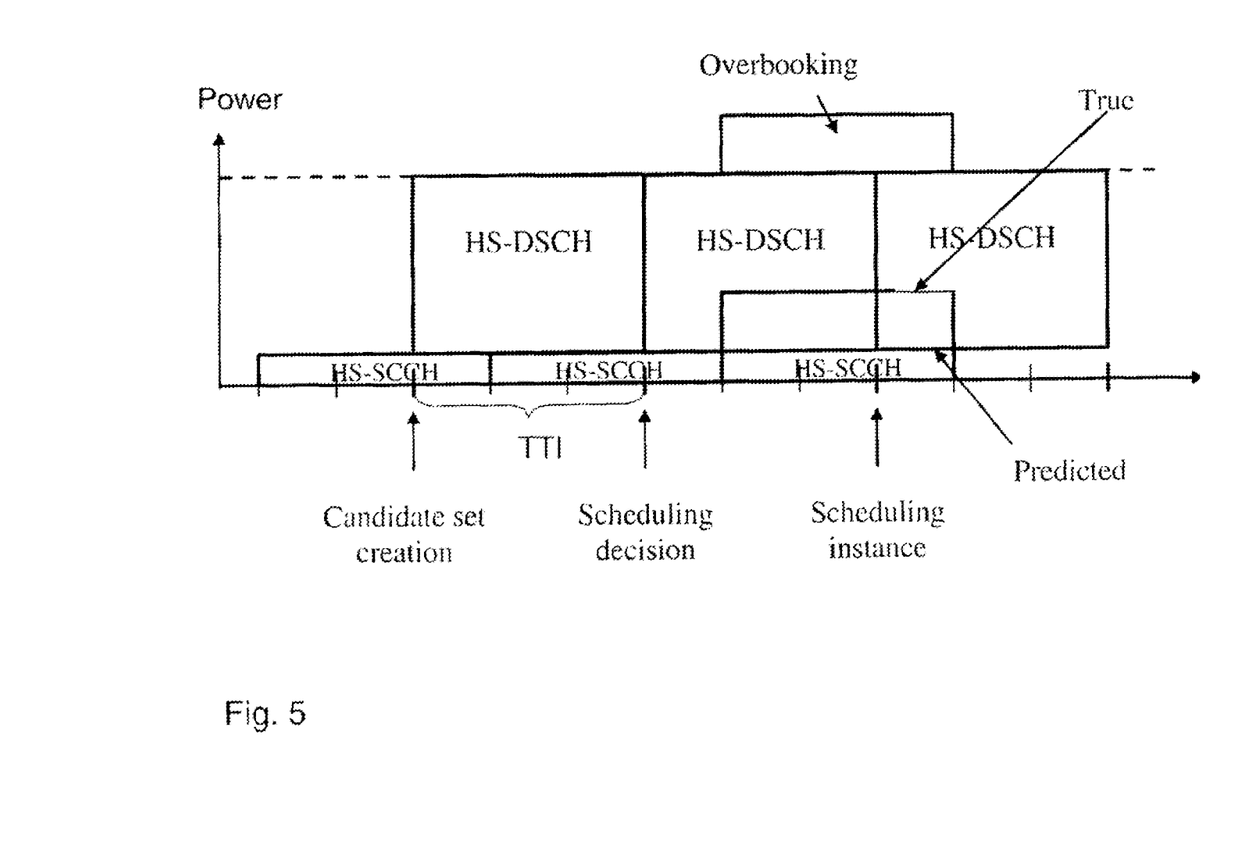
FIG. 5 illustrates the scenario when overbooking occurs when a scheduled user is not within the candidate set.
Figure 6:
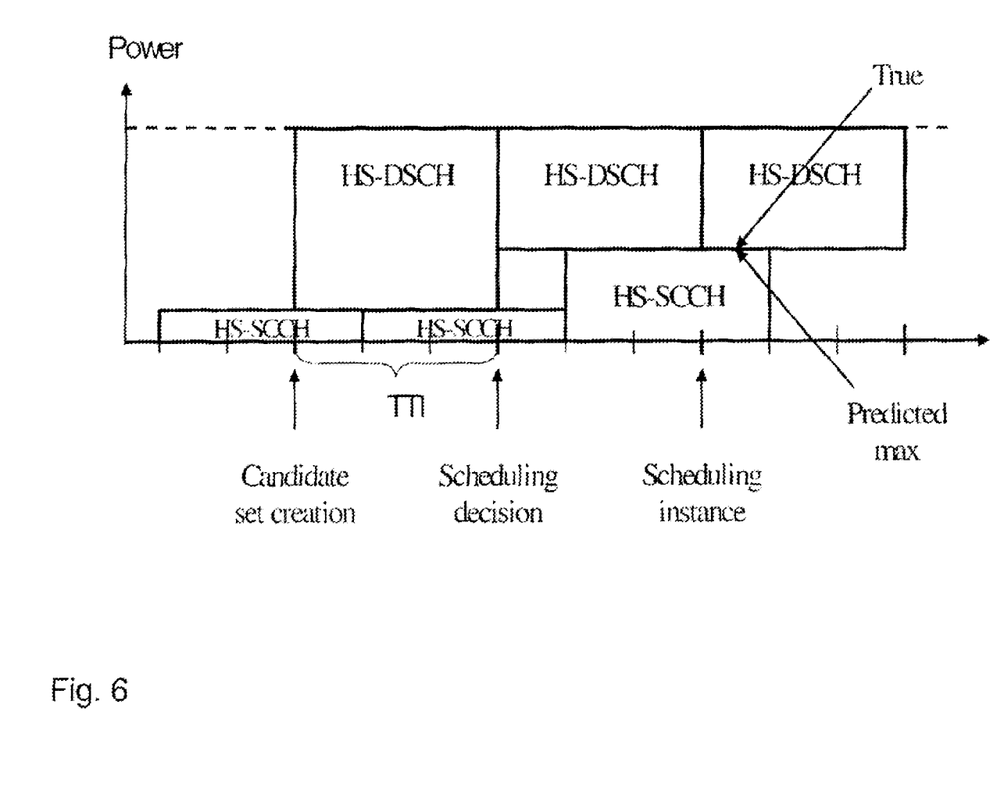
FIG. 6 illustrates the scenario when overbooking does not occur when a scheduled user is within the candidate set.

According to an embodiment of the present invention, the scheduler is only allowed to schedule users included in the candidate set. This implies that a user first must qualify for being included in candidate set to be able to receive data. The candidate set may be updated if a new user becomes active or when new measurements (e.g., CQI, throughput) are obtained. This sharply decreases the risk for overbooking. In this case, overbooking only occurs if new measurements indicate that larger HS-SCCH power than the reserved HS-SCCH is needed, or if the non-HS power is larger at the time of transmission than at the time of HS-DSCH power allocation. This is illustrated in the FIGS. 5 and 6, wherein FIG. 5 illustrates the scenario when overbooking occurs when a scheduled user is not within the candidate set and FIG. 6 illustrates the scenario when overbooking does not occur when a scheduled user is within the candidate set.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method in a base station of a mobile telecommunication network for reserving base station power for first and second channels, wherein the base station comprises a transmitter configured to communicate with users on said first channel and configured to communicate with said users on said second channel, wherein the second channel is associated to the first channel, and a scheduler for scheduling the users on the first channel and the second channel, wherein a timing of the first and second channels are overlapping, the method comprising steps of:

calculating, for each user, a probability that the user will be selected for transmission by the scheduler at a time denoted TTI+t;

based on the calculation, determining a candidate set of subsets of users, wherein the subsets of users included in the candidate set have a high probability to be scheduled by said scheduler at a time denoted TTI+t;

estimating a required power of the first channel for a subset of users of the candidate set requiring a highest power of the subsets of users in the candidate set at TTI+t;

scheduling a subset of users at a time TTI;

determining a required power of the first channel at the time TTI for said scheduled users;

determining a power of the first channel to be reserved at TTI based on the determined power of the first channel at TTI for said scheduled users and said estimated required power of the first channel for the subset of users of the candidate set requiring the highest power of the subsets of users in the candidate set at TTI+t; and, determining a power of the second channel to be reserved for the scheduled users based on the determined reserved power of the first channel at TTI, wherein t is a value equal to or larger than one.

2. The method according to claim 1, wherein the probability is determined based on a channel quality index of the channels of the users.

3. The method according to claim 1, wherein the probability is determined based on a measurement of an obtained user throughput.

4. The method according to claim 1, wherein the probability is determined based on a QoS related parameter of the channels of the users.

5. The method according to claim 1, wherein the probability is determined based on a delay of the channels of the users.

6. The method according to claim 1, wherein the candidate set is determined such that users having a higher probability than a predetermined threshold is included in the candidate set.

7. The method according to claim 1, further comprising a step of scheduling only the users that are included in the candidate set.

8. The method according to claim 1, wherein the mobile telecommunication network is a Wideband Code Division Multiple Access (WCDMA)—based network adapted to perform High Speed Downlink Packet Access (HSDPA).

9. An arrangement in a base station of a mobile telecommunication network for reserving base station power for first and second channels, wherein the base station comprises a transmitter configured to communicate with users on said first channel and configured to communicate with said users on said second channel, wherein the second channel is associated to the first channel, and a scheduler for scheduling the users on the first and second channels, wherein a timing of the at least one first and second channels are overlapping, said arrangement comprising:

a calculator, when executed by processing circuitry, calculating, for each user, a probability that the user will be selected for transmission by the scheduler at a time denoted TTI+t;

a determiner, when executed by processing circuitry, determining, based on the calculation, a candidate set of subsets of users, wherein the subsets of users included in the candidate set have a high probability to be scheduled by said scheduler at a time denoted TTI+t;

an estimator, when executed by processing circuitry, estimating a required power of the first channel for a subset of users of the candidate set requiring a highest power of the subsets of users in the candidate set at TTI+t;

the scheduler, when executed by processing circuitry, scheduling a subset of users at a time TTI;

the determiner, when executed by processing circuitry, determining a required power of the first channel at the time TTI for said scheduled users;

the determiner, when executed by processing circuitry, determining a power of the first channel to be reserved at TTI based on the determined power of the first channel at TTI for said scheduled users and said estimated required power of the first channel for the subset of users of the candidate set requiring the highest power of the subsets of users in the candidate set at TTI+t; and, the determiner, when executed by processing circuitry, determining a power of the second channel to be reserved for the scheduled users based on the determined reserved power of the first channel at TTI, wherein t is a value equal to or larger than one.

10. The arrangement according to claim 9, wherein the probability is determined based on a channel quality index of the channels of the users.

11. The arrangement according to claim 9, wherein the probability is determined based on a measurement of an obtained user throughput.

12. The arrangement according to claim 9, wherein the probability is determined based on a QoS related parameter of the channels of the users.

13. The arrangement according to claim 9, wherein the probability is determined based on a delay of the channels of the users.

14. The arrangement according to claim 9, wherein the candidate set is determined such that users having a higher probability than a predetermined threshold is included in the candidate set.

15. The arrangement according to claim 9, wherein the scheduler schedules only the users that are included in the candidate set.

16. The arrangement according to claim 9, wherein the mobile telecommunication network is a Wideband Code Division Multiple Access (WCDMA)—based network adapted to perform High Speed Downlink Packet Access (HSDPA).

* * * * *

UNITED STATES PATENT AND TRADEMARK OFFICE
CERTIFICATE OF CORRECTION

| | | |
|---|---|---|
| PATENT NO. | : 8,259,756 B2 | Page 1 of 1 |
| APPLICATION NO. | : 12/301355 | |
| DATED | : September 4, 2012 | |
| INVENTOR(S) | : Olsson et al. | |

It is certified that error appears in the above-identified patent and that said Letters Patent is hereby corrected as shown below:

On the Face Page, in Field (57), under "ABSTRACT", in Column 2, Line 2, delete "of UI" and insert -- of TTI --, therefor.

On the Face Page, in Field (57), under "ABSTRACT", in Column 2, Line 6, delete "i.e.," and insert -- I.e., --, therefor.

In Column 2, Line 3, delete "fourth." and insert -- forth. --, therefor.

In Column 4, Line 61, delete "i.e.," and insert -- I.e., --, therefor.

In Column 5, Line 62, delete "set" and insert -- set. --, therefor.

In Column 6, Lines 55-56, delete "value) $\leqq 1$." and insert -- value$\geqq 1$. --, therefor.

In Column 7, Line 32, delete "CQI 3=18." and insert -- CQI 3=18, --, therefor.

In Column 9, Line 52, delete "HS-SCCHL" and insert -- HS-SCCH --, therefor.

In Column 10, Line 7, delete "i.e.," and insert -- I.e., --, therefor.

Signed and Sealed this
Nineteenth Day of February, 2013

Teresa Stanek Rea
*Acting Director of the United States Patent and Trademark Office*